US008165999B2

(12) United States Patent
Jadhav et al.

(10) Patent No.: US 8,165,999 B2
(45) Date of Patent: Apr. 24, 2012

(54) XML/DATABASE/XML LAYER ANALYSIS

(75) Inventors: Mohan K. Jadhav, Bangalore (IN); Debarshi Raha, WestBengal (IN)

(73) Assignee: International Business Machines Corporation, Armonk, NY (US)

( * ) Notice: Subject to any disclaimer, the term of this patent is extended or adjusted under 35 U.S.C. 154(b) by 587 days.

(21) Appl. No.: 12/179,945

(22) Filed: Jul. 25, 2008

(65) Prior Publication Data
US 2010/0023539 A1 Jan. 28, 2010

(51) Int. Cl.
*G06F 7/00* (2006.01)
*G06F 17/00* (2006.01)
(52) U.S. Cl. .......................... 707/690; 707/701
(58) Field of Classification Search .................. 707/687, 707/690, 701
See application file for complete search history.

(56) References Cited

U.S. PATENT DOCUMENTS

| | | | |
|---|---|---|---|
| 5,291,511 A * | 3/1994 | Maher et al. ................... | 370/428 |
| 5,918,200 A * | 6/1999 | Tsutsui et al. ................ | 702/180 |
| 6,173,057 B1 * | 1/2001 | Truong et al. ................. | 380/255 |
| 7,003,526 B1 * | 2/2006 | Lee et al. ....................... | 707/687 |
| 7,054,881 B2 * | 5/2006 | Arcand et al. ................ | 707/687 |
| 7,164,758 B1 * | 1/2007 | Schneider et al. ........... | 379/126 |
| 7,260,585 B2 | 8/2007 | Krishnaprasad et al. | |
| 7,756,839 B2 * | 7/2010 | Hunter et al. ................ | 707/687 |
| 7,774,321 B2 * | 8/2010 | Tomic et al. .................. | 707/690 |
| 2002/0188611 A1 * | 12/2002 | Smalley et al. ............... | 707/100 |
| 2003/0126156 A1 * | 7/2003 | Stoltenberg et al. ....... | 707/104.1 |
| 2003/0163603 A1 * | 8/2003 | Fry et al. ........................ | 709/328 |
| 2004/0004966 A1 * | 1/2004 | Foster et al. .................. | 370/399 |
| 2005/0039166 A1 * | 2/2005 | Betts et al. .................... | 717/114 |
| 2005/0149538 A1 * | 7/2005 | Singh et al. ................... | 707/100 |
| 2006/0026167 A1 * | 2/2006 | Pasumansky et al. ......... | 707/10 |
| 2006/0085378 A1 * | 4/2006 | Raizman et al. ................ | 707/1 |
| 2006/0143056 A1 * | 6/2006 | Taylor et al. ..................... | 705/4 |
| 2007/0067307 A1 * | 3/2007 | LePoutre et al. .............. | 707/10 |
| 2007/0255719 A1 * | 11/2007 | Baikov et al. ................... | 707/10 |
| 2007/0294282 A1 * | 12/2007 | Cruver .......................... | 707/102 |
| 2008/0091659 A1 * | 4/2008 | McFaul ............................ | 707/3 |
| 2008/0140799 A1 * | 6/2008 | Holt ............................. | 709/212 |

OTHER PUBLICATIONS

Zhang, J.; Zhang, L.-J.; , "Criteria analysis and validation of the reliability of Web services-oriented systems," Web Services, 2005. ICWS 2005. Proceedings. 2005 IEEE International Conference on , vol., no., pp. 2 vol. (xxxiii+856), Jul. 11-15, 2005 doi: 10.1109/ICWS.2005.44 URL: http://ieeexplore.ieee.org/stamp/stamp.jsp?tp=&arnumber=1530854&isnu.*

Banerjee, S., et al., "Oracle8i—The XML Enables Data Management System", Oracle Corporation, In Proc. of the 16th International Conference on Data Engineering, pp. 561-568 (2000), USA.

(Continued)

*Primary Examiner* — Jean B Fleurantin
*Assistant Examiner* — Mark Hershley
(74) *Attorney, Agent, or Firm* — Sughrue Mion, PLLC.

(57) ABSTRACT

An automated method for testing XML/Database/XML layers. To the extent that XML is the de facto communication standard for today's middleware products, most of the middleware products need to produce/accept XML data at some interfaces. This data either comes from or needs to be persisted into DB (database). Two end points are thus represented by XML input/output and DB. To ensure the accuracy of data at the two end points, the same data are typically converted from one format to another between the end points. Manual verification in this vein is possible for development purposes, but in practice this presents inefficiencies if done repeatedly. Accordingly, there is broadly contemplated herein an automation technique to verify the accuracy of data at the two end points.

11 Claims, 7 Drawing Sheets

Architecture

OTHER PUBLICATIONS

Beck, K., et al., "JUnit Test Framework", retreived Dec. 2, 2011.

EPCglobal Inc., EPC Information Services (EPCIS) Version 1.0 Specification, EPCglobal, http://epcglobalonline.org/standards/epcis/epcis_1_0-standard20070412.pdf (Apr. 2007).

Fong, J., et al., "Converting Relational Database into XML Document", Dept. of Comput. Sci., City Univ. of Hong Kong, In Proc. Of 12th International Workshop on Database and Expert Systems Applications, pp. 61-65 (2001).

Java Architecture for XML binding, Project JAXB, retrieved Nov. 16, 2011 http://java.sun.com/webservices/jaxb/.

Jiang, H., et al., "XParent: An Efficient RDBMS—Based XML Database System", Hong Kong Univ. of Sci.& Tech. In Proc. of 18th International Conference on Data Engineering (ICDE), pp. 335-336 (2002).

Mabanza, N., et al., "Performance Evaluation of Open Source Native XML databases—A Case Study", Dept. of Comput. Sci., Fort Hare Univ. In the 8th International Conference on Advanced Communication Technology, pp. 1861-1865 (2006).

Raha, D., et al., "Automation Method for Testing XML/DB/XML Layers", IBM India Software Labs., In First International Conference on Software Testing, Verification, and Validation, pp. 458-464 (2008).

Saracco, C., et al., "DB2 9: pureXML Overview and Fast Start." IBM Redbooks, http://www.ibm.com/redbooks, (Jun. 2006).

Sosnoski, D., "XML and Java technologies: Data binding, Part 1: Code generation approaches—JAXB and more", IBM Developer Works, http://www-128.ibm.com/developerworks/library/x-databdopt/index/html. (2003).

SourceFourge, Inc., "Hibernate—Relational Persistence for Idiomatic Java", http://sourceforge.net/projections/hibernate/ retrieved Nov. 29, 2011.

Wang, J., et al., "Extending XML Database to Support Open XML", Oracle Corporation, In. Proc. of the 20th International Conference on Data Engineering (ICDE), pp. 813-816 (2004).

World Wide Web Consortium (W3C), XML Schema, http://www.w3.org/XML/Schema (Oct. 2004).

Worldwide Web Consortium (W3C), Extensible Markup Language 1.0 (Fourth Edition), http://www.w3.org.XML/ (Aug. 2006).

* cited by examiner

Fig. 1a. Two end points of the system

```
<xsd:complexType name="Name">
  <xsd:sequence>
    <xsd:element    name="firstName"
type="xsd:string" />
    <xsd:element    name="lastName"
type="xsd:string" />
  </xsd:sequence>
</xsd:complexType>
```

Fig. 2. 'Name' Schema

```
public class Name{
  protected String firstName;
  protected String lastName;

public   Name(String    firstName,
String lastName){...}
  public  void  setFirstName(String
firstName){...}
  ...
}
```

Fig. 3. 'Name' Class

```
<Name>
    <firstName>abc</firstName>
    <lastName>xyz</lastName>
</Name>
```

Fig. 4. Sample XML

Table1

| id | firstName | lastName |
|---|---|---|
| 1 | abc | 3 |

Table2

| Id | lastName |
|---|---|
| 3 | xyz |

Fig. 5. XML persisted into DB

```
<xsd:complexType name="Person">
  <xsd:sequence>
    <xsd:element name="age" type="xsd:int" />
    <xsd:element name="name" type="Name" />
  </xsd:sequence>
</xsd:complexType>
```

Fig. 6. 'Person' Schema

```
public class Person{
        protected int age;
        protected Name name;

public    void    setAge(int age){...}
        public int getAge(){...}
        public    void    setName(Name name){...}
        public Name getName(){...}

...
}
```

Fig. 7. 'Person' Class

Table1

| id | firstName | lastName | age |
|---|---|---|---|
| 1 | Abc | 3 | 25 |

Table2

| id | lastName |
|---|---|
| 3 | xyz |

Fig. 8.

```
public class Name{
  protected String firstName;
  protected String lastName;
  public void setFirstName(String firstName){...}
  public String getFirstName() {...}
  public void setLastName(String firstName){...}
  public String getlastName(){...} public void load(int id){
    /*Join Table1 & Table2 and query DB for the values of 'firstName' & 'lastName' for the person with given id */
    /*call 'setFirstName()' & 'setLastName()' to assign the values */
  }

...
} public class Person{
  protected int age;
  protected Name name;
  public void setAge(int age){...}
  public int getAge(){...}
  public void setName(Name n) {..}
  public Name getName(){...} public void load(int id){/*load the person with this id */

/*query DB for the value of age and assign it by calling 'setAge()' */
    name = new Name();
    /*initialize 'name'. Association happens */
    name.load(id); //load it
  }
  ...
}
```

Fig. 9. Generated Classes with 'load()' methods

Fig. 10. Chain Object Loading

```
Class A{
  int i; //simple type
  B b; //complex type public boolean equals(Object obj){ if (obj == null) {
        return false;
    }
    if (obj.getClass() != this.getClass()) {
        return false;
    }

A a=(A)obj;

boolean result = (i==a.i)  &&  (b==null
? a.b==null : b.equals(a.b)) && ........;

return result;
  }
}
```

Fig. 11. Sample Class with
'equals()' method

Fig. 12. Architecture

XML/DATABASE/XML LAYER ANALYSIS

FIELD OF THE INVENTION

The present invention relates generally to undertaking analysis of XML/Database/XML layers to verify the accuracy of the data therein.

BACKGROUND OF THE INVENTION

XML is the de facto communication standard for today's middleware products, a very convenient protocol for exchanging data in an application neutral way. Accordingly, most middleware products need to produce and accept XML data at some interfaces. At the same time, such data either comes from or needs to be persisted into DB (Database).

Accordingly there are two clear end points in such a setting; one is XML input/output and other is DB. By way of ensuring the accuracy of data at the two end points, it is known to convert the same data from one format to another between the end points. Manual verification in this vein is possible for development purposes, but in practice this presents inefficiencies if done repeatedly. Thus, a compelling need has been recognized in connection with averting such inefficiencies.

SUMMARY OF THE INVENTION

Broadly contemplated herein, in accordance with at least one presently preferred embodiment of the present invention, is an automation technique to verify the accuracy of data at the two end points (XML input/output and DB) discussed heretofore.

In summary, one aspect of the invention provides a method comprising: providing a communications interface; providing a database in communication with the communications interface; validating accuracy of data conveyed between the communications interface and the database; the validating comprising: obtaining input data conveyed between the communications interface and the database; obtaining output data conveyed between the database and the communications interface; generating common classes; automatically converting the input data and output data into the common classes; and comparing the input data and output data via predetermined criteria.

Another aspect of the invention provides an apparatus comprising: a processor; a main memory; the processor comprising a communications interface; the main memory comprising a database in communication with the communications interface; a validator which validates accuracy of data conveyed between the communications interface and the database; the validator acting to: obtain input data conveyed between the communications interface and the database; obtain output data conveyed between the database and the communications interface; generate common classes; automatically convert the input data and output data into the common classes; and compare the input data and output data via predetermined criteria.

Furthermore, an additional aspect of the invention provides a program storage device readable by machine, tangibly embodying a program of instructions executable by the machine to perform a method comprising: providing a communications interface; providing a database in communication with the communications interface; validating accuracy of data conveyed between the communications interface and the database; the validating comprising: obtaining input data conveyed between the communications interface and the database; obtaining output data conveyed between the database and the communications interface; generating common classes; automatically converting the input data and output data into the common classes; and comparing the input data and output data via predetermined criteria.

For a better understanding of the present invention, together with other and further features and advantages thereof, reference is made to the following description, taken in conjunction with the accompanying drawings, and the scope of the invention will be pointed out in the appended claims.

BRIEF DESCRIPTION OF THE DRAWINGS

FIG. 1 schematically illustrates a computer system with which a preferred embodiment of the present invention can be used.

FIG. 1a schematically illustrates two communications endpoints.

FIG. 2 conveys code for a "name" schema.

FIG. 3 conveys code for a "name" class.

FIG. 4 conveys code for a sample XML.

FIG. 5 conveys tables illustrating XML data persisted into a database.

FIG. 6 conveys code for a "person" schema.

FIG. 7 conveys code for a "person" class.

FIG. 8 conveys the tables of FIG. 5 with changes.

FIG. 9 conveys code for providing generated classes with "load( )" methods.

FIG. 10 schematically illustrates chain object loading.

FIG. 11 conveys code for a sample class with an "equals( )" method.

FIG. 12 schematically illustrates an architecture for carrying out an embodiment of the present invention.

DETAILED DESCRIPTION OF THE PREFERRED EMBODIMENTS

For a better understanding of the present invention, together with other and further features and advantages thereof, reference is made to the following description, taken in conjunction with the accompanying drawings, and the scope of the invention will be pointed out in the appended claims.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1-12, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

Figure 1:
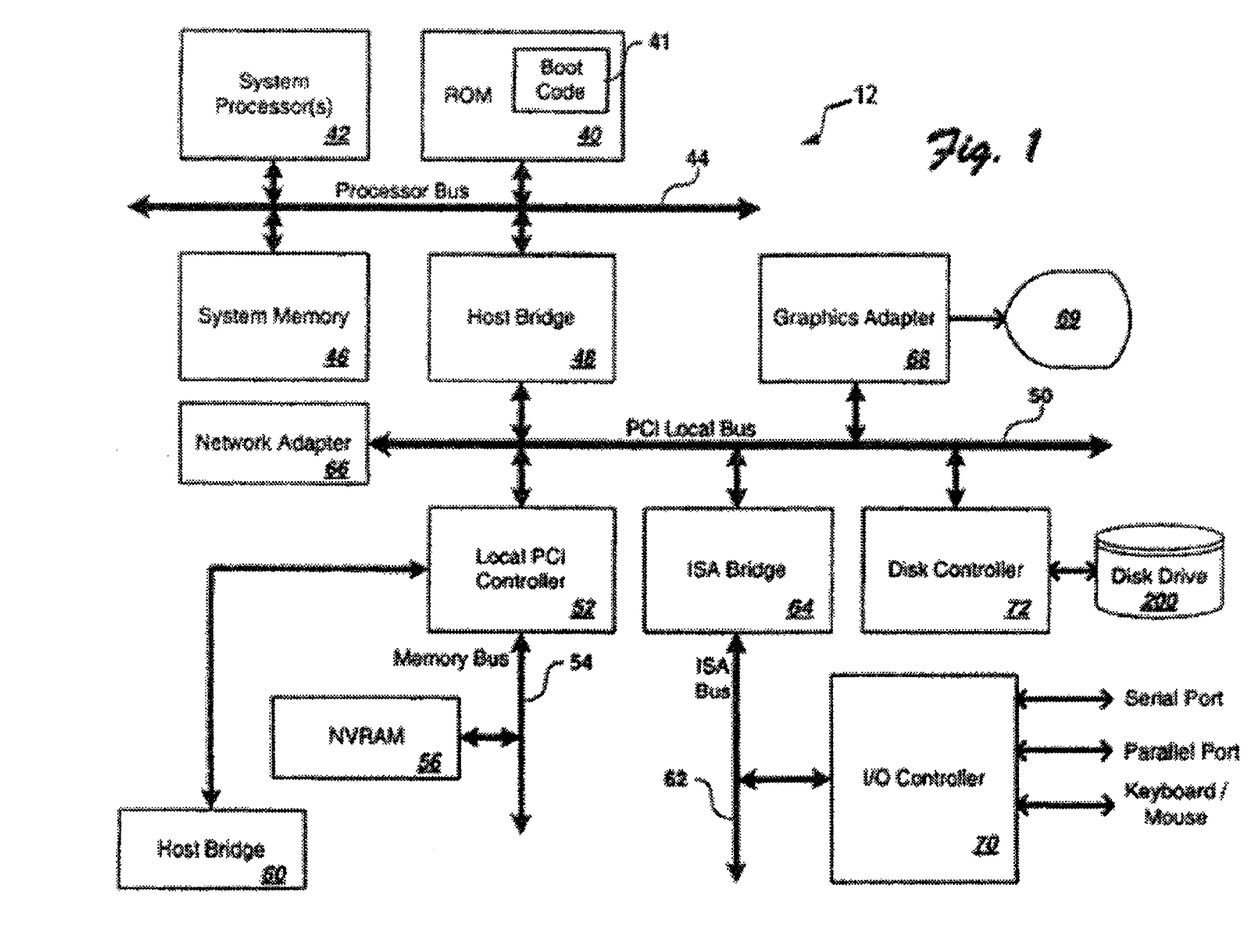

Referring now to FIG. 1, there is depicted a block diagram of an illustrative embodiment of a computer system 12. The illustrative embodiment depicted in FIG. 1 may be a notebook computer system, such as one of the ThinkPad® series of personal computers previously sold by the International Business Machines Corporation of Armonk, N.Y., and now sold by Lenovo (US) Inc. of Morrisville, N.C.; however, as will become apparent from the following description, the present invention is applicable to any data processing system. Notebook computers, as may be generally referred to or understood herein, may also alternatively be referred to as "notebooks", "laptops", "laptop computers" or "mobile computers".

As shown in FIG. 1, computer system 12 includes at least one system processor 42, which is coupled to a Read-Only Memory (ROM) 40 and a system memory 46 by a processor bus 44. System processor 42, which may comprise one of the AMD™ line of processors produced by AMD Corporation or a processor produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to a local area network (LAN), and graphics adapter 68, which interfaces computer system 12 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 12 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard and mouse. In addition, I/O controller 70 supports external communication by computer system 12 via serial and parallel ports, including communication over a wide area network (WAN) such as the Internet. A disk controller 72 is in communication with a disk drive 200 for accessing external memory. Of course, it should be appreciated that the system 12 may be built with different chip sets and a different bus structure, as well as with any other suitable substitute components, while providing comparable or analogous functions to those discussed above.

As touched on heretofore, XML is a very common communications means, a simple and flexible format for data exchange, in today's software world. One can structure messages with XML and send the messages across interfaces.

After validating and processing these messages, there is typically a need to persist all or part of the message to a database (DB) for future operations (e.g., a need to construct the same XML data from DB and send it to same/another interface again according to given needs). With respect to the system shown in FIG. 1, XML can be managed by system processor 42 while DB can be contained in system memory 46.

Figure 1A:
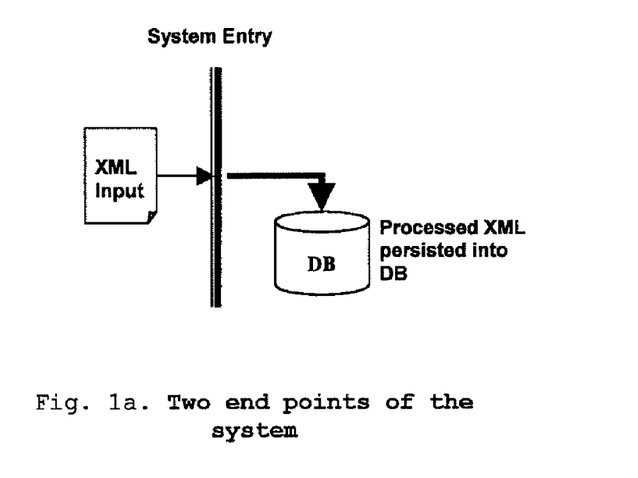

Generally, it is essential at times, even in a context of smooth operation of the product, for the accuracy of data at each XML interface or in DB to be validated. This clearly becomes a challenge because of the volume of data that flows in and out of the system and the variation of data that would need to be tested. FIG. 1a shows an example of a system taking XML messages from an input interface and persisting relevant data into DB.

At this point, there would be a need to run tests with all the valid and invalid XML messages and check with DB if the data was correctly persisted or not. For merely a functional verification test or system verification test, there is little concern about how efficiently the system processes the input XML and persists it into DB. However, if the schema of the input XML/DB is complicated enough, then manually checking DB against XML input becomes cumbersome. Further, when it is kept in mind that a regression test would multiply the number of tests that need to be done, it becomes clear that manual testing presents inefficiencies of an incredible magnitude. Accordingly, the disclosure now turns to automation techniques broadly contemplated herein in accordance with at least one presently preferred embodiment of the present invention, and which significantly avert such inefficiencies.

XML schema and DB schema are two different types of structures The schema for XML is hierarchical in nature while that of a typical database is relational. By way of comparing XML data with combined data in various tables in DB, several options are conceivable:

1) Create the XML back out of DB and compare with the input XML.
2) Parse the input XML and compare the values with DB.
3) Agree on a common object model. Make two sets of objects one from input XML and one from DB and compare them.

For the first option, creating the XML according to the schema from DB is not easy. If created, comparing may not be easy in the case of string comparison since ordering within strings can be indeterminate. For example, consider the XML

```
<products>
<a/>
<b/>
</products>
```

If the system persists product 'b' first into DB and product 'a' in the next row, then the created XML from DB may look like

```
<products>
<b/>
<a/>
</products>
```

Thus, string comparison would fail here.

The second option, on the other hand, involves building some part of the product again, as it is also doing the same thing (parsing the input XML and storing—instead of comparing—the values in DB).

Before turning to possibilities encompassed by the above-listed third option, it is worthwhile to look at some current XML technologies. If there are XSD schema ("XML Schema Definition") for the XML, then the schema can be mapped to a set of classes for example to set of classes of an object oriented programming language such as Java. As such, there are several XML data binding technologies that can generate classes out of XSD, and also read the data in the XML into objects of those classes.

If these classes are thought of as common structure so that one can convert both input XML and persisted data in DB into these objects (the classes) and compare them, then the task merely becomes an issue of converting XML data and DB data into a common set of objects.

In the subsequent comparison task, while keeping in mind that whole XML data may not be persisted into DB, there is a need to control or manage the definition of when to declare two objects equal. However, as now will be described, an automation process can now be greatly facilitated in accordance with at least one embodiment of the present invention if the "third option" at hand is employed.

Figure 2:
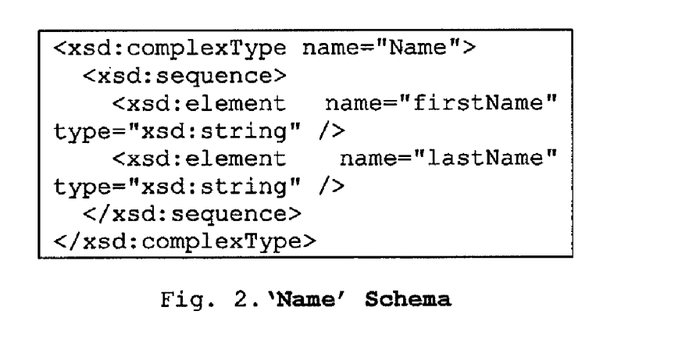

By way of generating common classes, one can preferably assume that all input XML conform to a well defined schema (XSD). Preferably, one can make use of any XSD data binding technologies available to do this work. This will generate a set of classes according to the XSD, as exemplified by an illustrative "name" schema as shown in FIG. 2.

Figure 3:
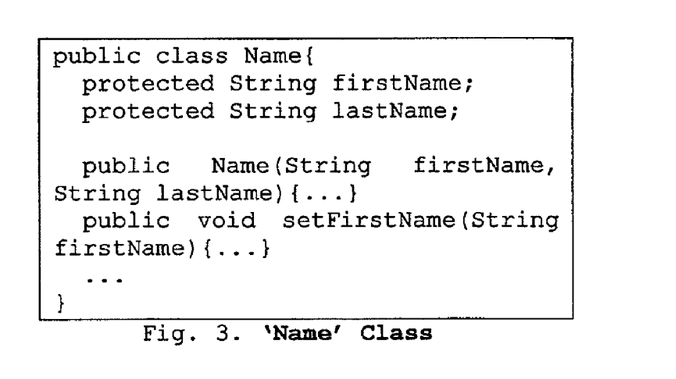

This XSD may then be converted to a single class, as exemplified by the schema shown in FIG. 3. Certainly, the resultant classes are sufficient to serve as common classes if the XSD structures are well retained in the classes and they can be manipulated.

By way of converting XML into objects, generated classes from XSD are generally sufficient for converting the XML into objects of these classes. Particularly, the same technology (XML data binding technology) will permit the reading of the XML into objects of these classes. For example, see FIG. 4, where the sample XML shown may be read as 'new Name (abc,xyz)' (wherein the 'Name' class is defined in FIG. 3).

As a matter of contrast, data in the database will generally not fit as easily into the generated common classes as do XML data. Particularly, for the XML above (FIG. 4), 'firstName' and 'lastname' can be persisted into different tables with a foreign key relationship as shown in FIG. 5. However, there is no way to fit this data into the 'Name' class (FIG. 3) other than via joining the two tables and query. Particularly, 'firstName' and 'lastName' would have to be read from the query results, and the object created; this would need to be done in initializing all the classes.

In then considering a pattern assumed by the XSD generated classes, an XML document can have only one root element while all other elements are "children" of this root element. Thus, a parent-child relationship is evident, which is applicable for any element.

Figure 4:
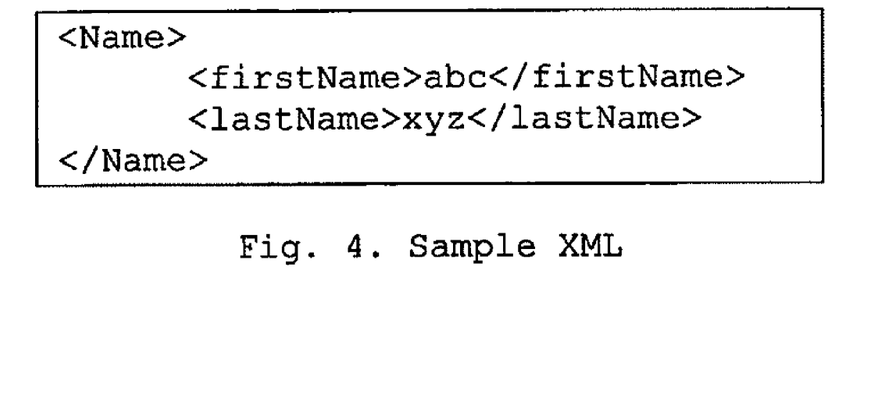
Figure 5:
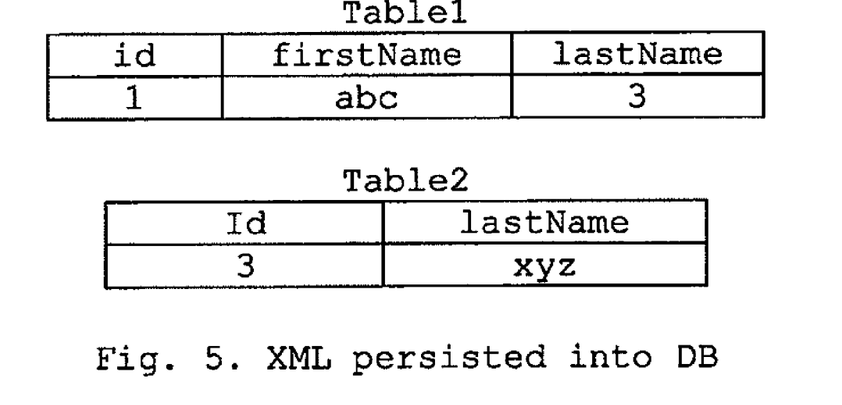
Figure 6:
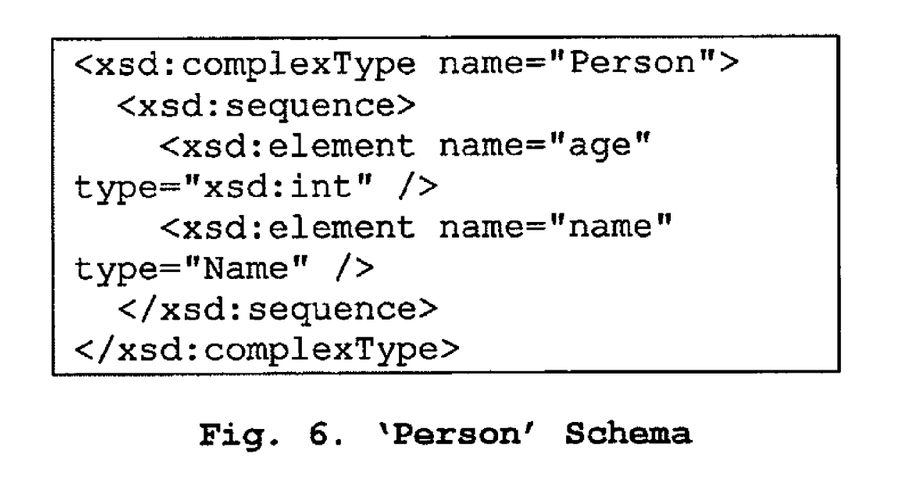
Figure 7:
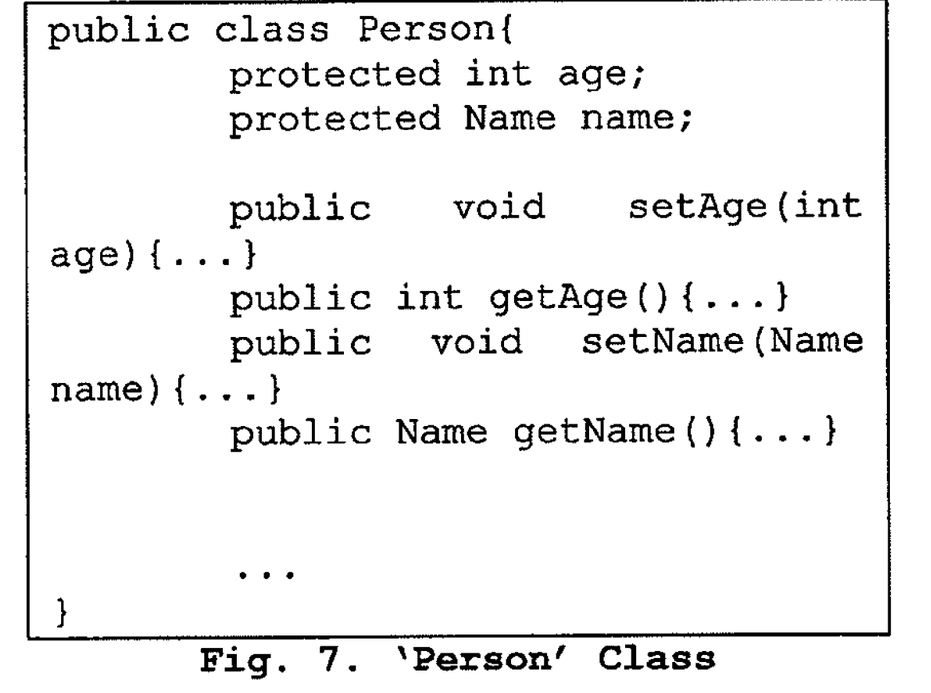

For example, 'firstName' is a child of the element 'Name' in FIG. 4. In FIG. 3, it can be seen that 'firstName' is a property of class 'Name' and there is an association (aggregation) relationship between classes 'Name' and 'String'. Thus, all the generated classes from XSD will be part of a parent-child relationship in XML, and such a pattern indeed can be a key for converting data from DB into objects. This can be aptly illustrated by the example shown in FIG. 6, a "person" schema (with the "Name" type being defined as in FIG. 2). A class generated from the schema of FIG. 6 may then appear as the "person" class illustrated in FIG. 7 (with the "Name" class defined in FIG. 3).

In accordance with this example, it can be seen that there is an associative (i.e., aggregative) relationship between the 'Person' and 'Name' classes.

Figure 8:
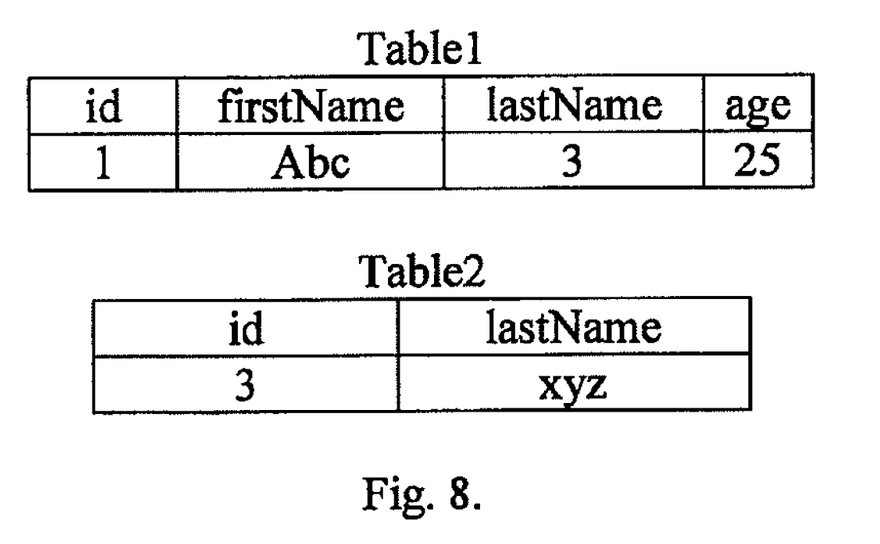

As such, the tables from FIG. 5 may be changed as now shown in FIG. 8. At this point, data would need to be loaded from the tables into the 'Person' class, which as a manual exercise is not difficult (e.g., copy age=25 to the 'age' property of 'Person' class, etc.) However, this presents a challenge in an automated arrangement, when values are scattered throughout different tables. Hypothetically, values could be read from DB and 'set' methods could be called to set the properties of all the classes from an outside source (e.g., from client code). However, if the schema is complicated and the number of classes generated is too high, then this presents an undesirable degree of complexity.

Figure 9:
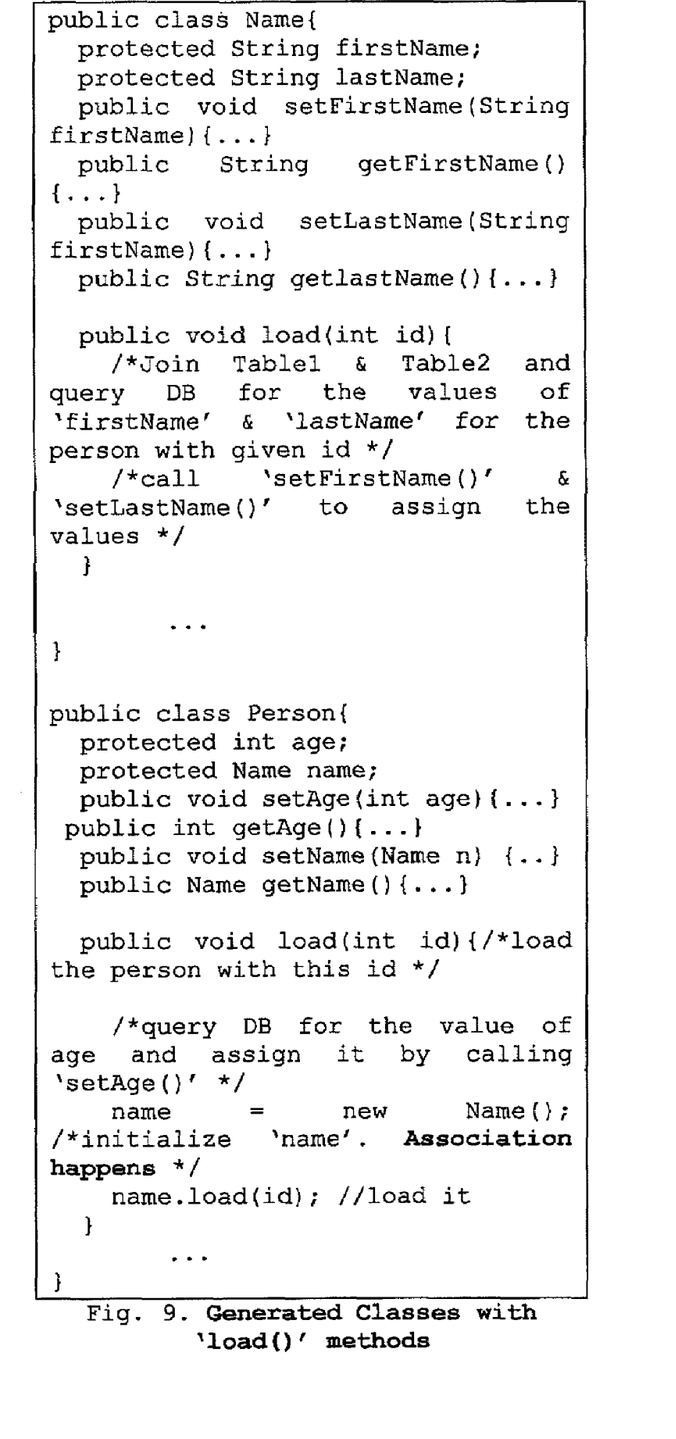
Figure 10:
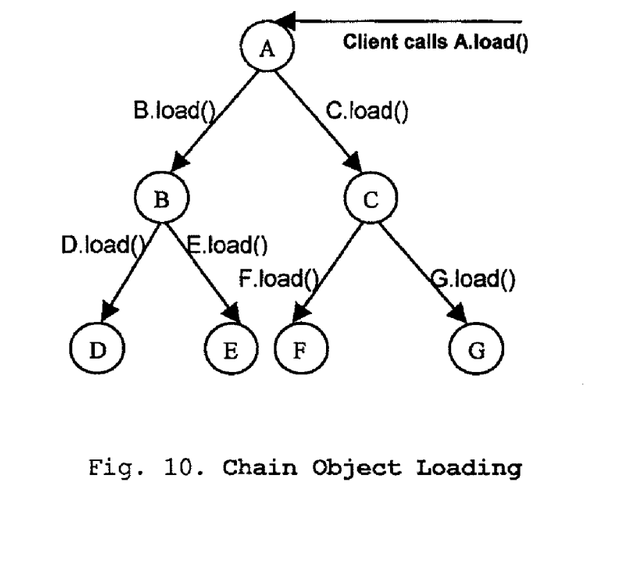

Accordingly, in accordance with a preferred embodiment of the present invention, the association (aggregation) between classes is preferably employed. As such, one 'load( )' method may preferably be added to each of the classes in order to permit each class to load itself. FIG. 9 illustrates modified 'Person' and 'Name' classes with such 'load( )' methods added.

Here, if 'Person' is the root element in the XSD, then the client test code would just need to initialize the 'Person' object and call the 'load( )' method thereupon; as such, the client test code need only be two lines long:

```
Person p = new Person( );
p.load(personID);
```

It may now be appreciated that this 'load( )' method of 'Person' will load all the properties of 'Person' from DB. If the type of one property is again an XSD generated class, then it will have load method which will be called in turn, e.g.:

Person.load( )->Name.load( )

Accordingly, all the 'load( )' methods will be called in a fixed succession from the root of the hierarchy downwards, and eventually all the classes will be initialized and associated; in this manner, data in DB ends up being fully converted into objects. This is aptly illustrated in FIG. 10, where "load( )" methods are applied to classes A-G inclusive, with A as the root, B and C at the next level of hierarchy, and D-G inclusive at the next level.

With XML data and DB data now being converted into a set of common related objects, a final step preferably will involve comparing the data automatically to validate the accuracy of the system.

While a simple case is represented when all the information in the XML is persisted into DB, this clearly does not apply to all situations; most of the time, all of the data in XML is not so persisted. For example, some elements used for header information or processing instructions might not be persisted, so that information is prone to be lost in DB with the result that objects constructed from XML will include such information but objects constructed from DB will not. Here, the two sets of objects would nominally be different, but could still be regarded as equal if items such as header information are regarded as superfluous.

This helps illustrate the need to define or predetermine guidelines for determining when two sets of objects will be "equal". Consequently, an 'equals( )' method is preferably defined in each of the XSD generated classes (applicable in case of JAVA). For example, in JAVA, the rules for determining two objects can be implemented using an equals( ) method, for determining if the two objects are equal. This will provide fine control over asserting the objects, in the manner of a chain call like similar to the 'load( )' method discussed heretofore.

Figure 11:
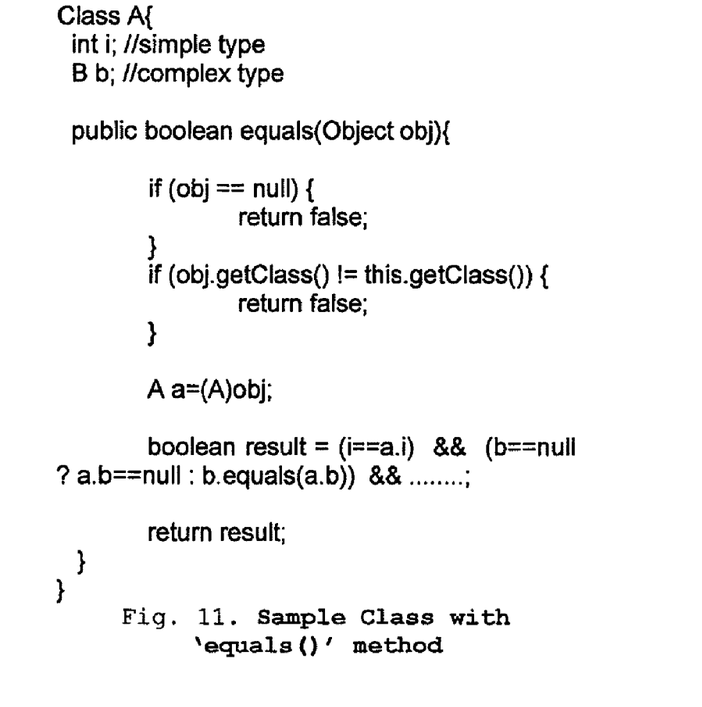

A very simple illustrative case is illustrated in FIG. 11, where 'A.equals( )' calls 'B.equals( )' in turn.

This represents the last part of an automated method of testing in accordance with at least one preferred embodiment of the present invention. For asserting two objects, one can make use of existing frameworks, e.g. JUnit framework, so that one line of code is required: Compare (output, input). Typically, during runtime, two sets of objects, one is from XML (input) and other is from DB (output) exist. To compare these two objects (Compare (output, input)), JUnit is used. JUnit provides a way to do this comparison using 'assertequals( )' method.

Figure 12:
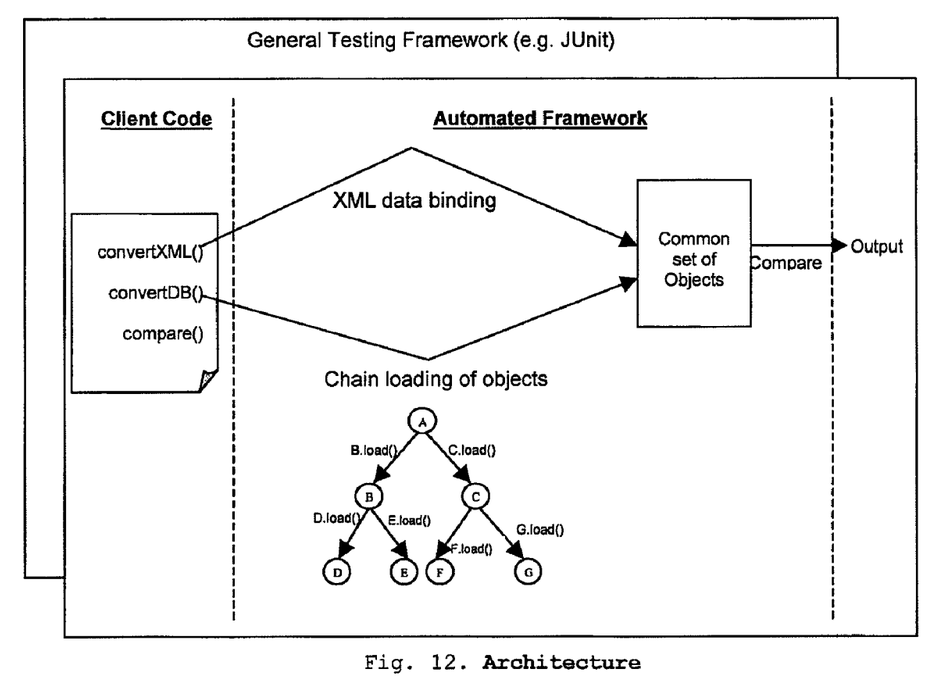

In brief recapitulation, and as aptly illustrated in the general architecture schematic of FIG. 12, there is broadly contemplated herein, in accordance with at least one presently preferred embodiment of the present invention, an automated arrangement for ensuring data accuracy at XML/DB/XML layers. An existing XML technology, XML data binding technology, may preferably be employed for assisting in solving this problem. Preferably, both the XML and data stored in DB may be converted into a set of objects and compared. A set of common classes is preferably generated in three steps, wherein: basic classes are generated from the XML schema (XSD); a 'load( )'method is added to all the generated basic classes for chain loading of the objects; and, finally, an 'equals( )' method is added for fine control over the comparing of objects. When the common classes and test data are ready, the test code can initiate the process (feed 'system to test' with XML input or invoke XML output, which can be done programmatically) and compare output (DB/XML) with input (XML/DB).

It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method comprising:
providing a communications interface;
providing a database in communication with the communications interface;
validating accuracy of data conveyed between the communications interface and the database;
said validating comprising:
obtaining input data conveyed between the communications interface and the database;
obtaining output data conveyed between the database and the communications interface;
generating common classes for the input data and the output data;
automatically converting the input data and output data into the generated common classes; and
comparing the converted input data and output data via predetermined criteria,
wherein said generating comprises including a provision to promote self-loading of the classes through chain object loading and establishing a hierarchy among the classes;
wherein said converting of output data into the classes comprises self-loading the classes in accordance with the established hierarchy, and
wherein the self-loading the classes comprises joining data from multiple tables in the database and loading the aggregated data in the classes.

2. The method according to claim 1, wherein said comparing comprises comparing the input data and output data via predetermined criteria defined in each of the classes.

3. The method according to claim 1, wherein said providing of a communications interface comprises providing a XML communications interface.

4. The method according to claim 3, wherein said generating comprises generating classes via XSD schema.

5. An apparatus comprising:
a processor;
a main memory;
said processor comprising a communications interface;
said main memory comprising a database in communication with said
communications interface;
a validator which validates accuracy of data conveyed between the communications interface and the database;
said validator acting to:
obtain input data conveyed between said communications interface and said database;
obtain output data conveyed between the database and the communications interface;
generate common classes for the input data and the output data;
automatically convert the input data and output data into the generated common classes; and
compare the converted input data and output data via predetermined criteria,
wherein said validator
establishes a hierarchy among the classes and self-loads the classes in accordance with the established hierarchy; and
compares the input data and output data via predetermined criteria defined in each of the classes,
wherein said generating comprises including a provision to promote self-loading of the classes through chain object loading;
wherein said converting the output data into the classes comprises self-loading the classes in accordance with the established hierarchy, and
wherein the self-loading the classes comprises joining data from multiple tables in the database and loading the aggregated data in the classes.

6. The apparatus according to claim 5, wherein:
said communications interface comprises a XML communications interface; and
said validator acts to generate classes via XSD schema.

7. A program storage device readable by machine, tangibly embodying a program of instructions executable by the machine to perform a method comprising:
   providing a communications interface;
   providing a database in communication with the communications interface;
   validating accuracy of data conveyed between the communications interface and the database;
   said validating comprising:
   obtaining input data conveyed between the communications interface and the database;
   obtaining output data conveyed between the database and the communications interface;
   generating common classes for the input data and the output data;
   automatically converting the input data and output data into the generated common classes; and
   comparing the converted input data and output data via predetermined criteria,
   wherein said generating comprises including a provision to promote self-loading of the classes through chain object loading and establishing a hierarchy among the classes;
   wherein said converting of output data into the classes comprises self-loading the classes in accordance with the established hierarchy, and
   wherein the self-loading the classes comprises joining data from multiple tables in the database and loading the aggregated data in the classes.

8. The device according to claim 7, wherein said comparing comprises comparing the input data and output data via predetermined criteria defined in each of the classes.

9. The device according to claim 7, wherein said providing of a communications interface comprises providing a XML communications interface.

10. The device according to claim 9, wherein said generating comprises generating classes via XSD schema.

11. The method according to claim 1, wherein the generating common classes comprises generating a set of common related objects.

* * * * *